United States Patent [19]

Wise

[11] Patent Number: 4,924,259
[45] Date of Patent: May 8, 1990

[54] MICROFORM PRINTER
[75] Inventor: David S. Wise, Solon, Ohio
[73] Assignee: Tameran, Inc., Chagrin Falls, Ohio
[21] Appl. No.: 258,210
[22] Filed: Oct. 14, 1988
[51] Int. Cl.⁵ ............................................ G03B 27/40
[52] U.S. Cl. ...................................... 355/57; 355/65; 354/246
[58] Field of Search .................. 355/43, 45, 55, 56, 355/65, 233, 243; 354/230, 241, 243, 245, 246-248

[56] References Cited

U.S. PATENT DOCUMENTS 4,355,891 10/1982 Cole et al. ........................ 355/243 X
4,750,021 6/1988 Holroyd et al. .................... 355/45 X Primary Examiner—L. T. Hix
Assistant Examiner—D. Rutledge
Attorney, Agent, or Firm—Calfee, Halter & Griswold

[57] ABSTRACT

A broad magnification ratio range, microform to paper printing system includes a fixed focal length objective lens, a selectively adjustable short zoom mirror assembly, a selectively adjustable long zoom mirror assembly and optical switching means selectively to exclude or include the long zoom mirror assembly to provide the optical path length needed for the magnification ratio selected. The printing system may include an aperture shutter assembly positioned immediately adjacent the image slit of the optical system, the aperture shutter assembly having two blades operative to set the aperture width therebetween to control drum exposure and also operative selectively to close the aperture therebetween to block drum exposure.

21 Claims, 4 Drawing Sheets

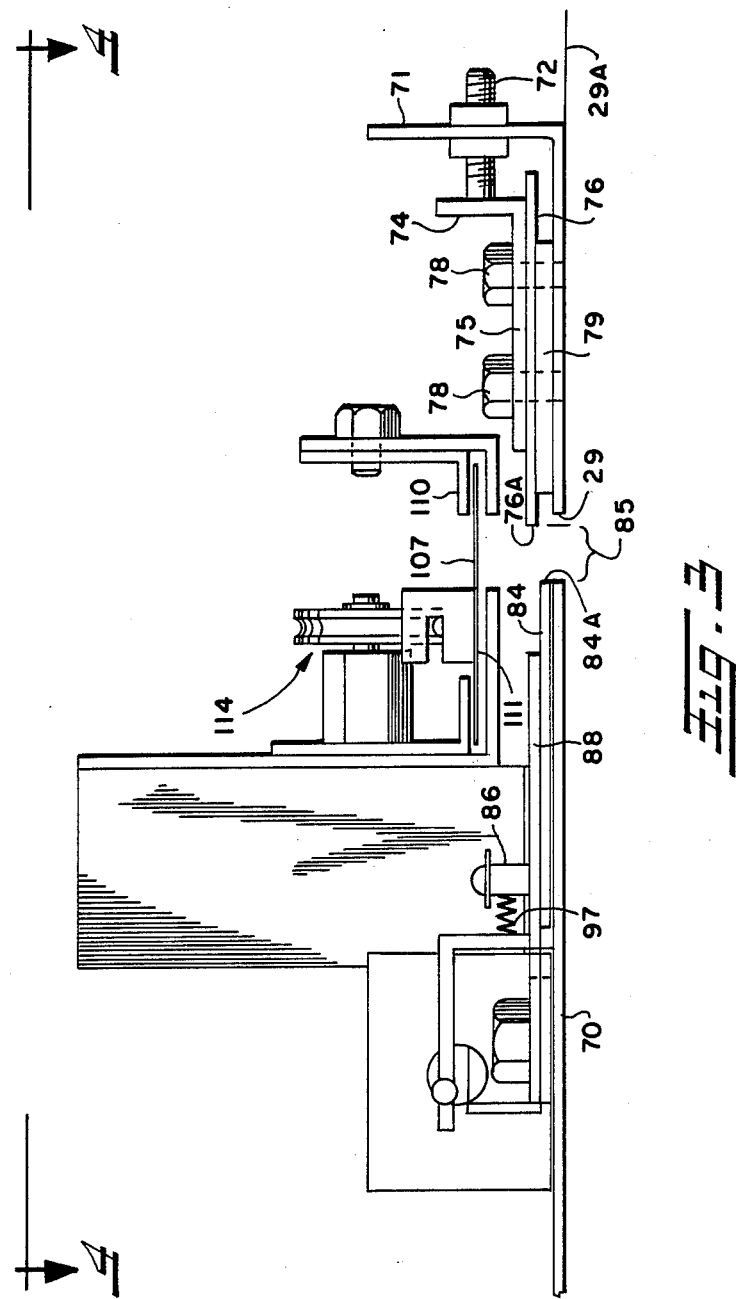

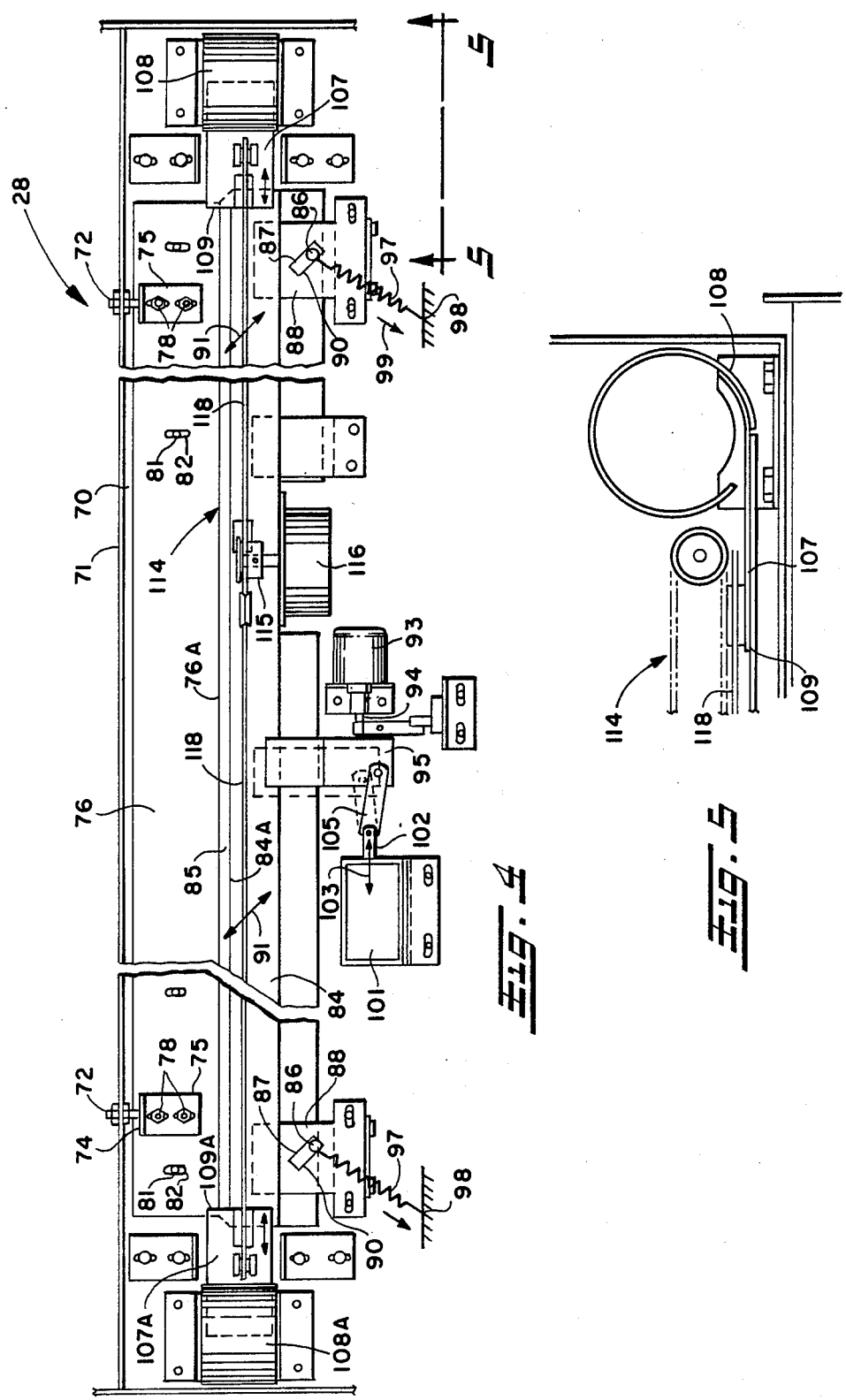

MICROFORM PRINTER

FIELD OF THE INVENTION

The present invention relates to a large microform to bond paper printer, in general, and to zoom magnification and aperture control systems therefor, in particular.

BACKGROUND OF THE INVENTION

Microfilm to paper printing machines may include a light beam sequentially passing through an optical path including the microfilm, an objective lens, a complementary pair of zoom mirrors, adjustable in tandem, an image slit and the image plane surface of a photoconductive printer drum. The magnification of the optical system is dependent upon the optical path distance from the film plane to the image plane for a specific fixed focal length objective lens. This distance for the optical path from the film plane to the image plane, known as the total conjugate length (TCL), can be changed by selectively reciprocally moving the pair of zoom lens mirrors relative to the film plane and the image plane. However, for an objective lens having a fixed focal length, the amount of magnification capable from the system is a function of the amount of movement possible for the complementary zoom mirror pair. This zoom mirror assembly movement is limited by the amount of room available in the console or housing of the printing machine.

If additional magnification is required or desired for the system, the objective lens in the system is normally removed from the console and replaced by an objective lens with a different focal length selectively providing the magnification ratio range desired. However, for machines handling large paper sizes requiring large magnification ratios, the objective lenses needed as replacements are relatively large, cumbersome and heavy. The operator has difficulty in physically storing and changing the objective lens and in properly positioning the replacement lens in and along the optical axis of the system.

The restricted sizes of the consoles for printer machines and the size of replacement lenses have been factors limiting the production of practically sized and easily used printing machines capable of printing copies up to 36 inches wide, with magnification ratios running from 7.4× through 32×. The size of the latent images optically being transferred onto the printer drum also may create problems in copy quality and masking.

In this regard, the masking of the margins of the microfilm image being copied is conventionally done along the optical axis upstream of the image slit leading to the image drum by a high speed shutter and by separate side masks. The aperture opening controlling the amount of light exposure on the photoconductive drum is normally increased or decreased by a pair of pivotally mounted parallel rods being positioned upstream of the image slit, with pivotal movement thereof controlling the effective opening or aperture therebetween. With large magnification ratios for printing onto large width paper, the positioning of the shutter, masks and aperture control upstream of the image slit plane of the optical system may decrease the quality of the print being made and may affect the accurate positioning of the marginal edges of the print.

SUMMARY OF THE INVENTION

The principal object of the present invention is to provide a microform printer capable of a magnification ratio range from 7.4× through 32× using the same fixed focal length objective lens. For this purpose, the microform printer of the present invention includes an adjustable short zoom mirror assembly and an adjustable long zoom mirror assembly. For magnification ratios in a certain lower range, such as 7.4× through 12.5×, the short zoom mirror assembly is in the optical path, with the long zoom mirror assembly being excluded from the optical path by optical switching means. The short zoom mirror assembly is adjustably positioned along its track length at the location required to give the optical path length needed to obtain the magnification ratio selected. For a larger magnification ratio range, such as from 12.5× through 32×, the adjustable long zoom mirror assembly is switched into the optical path, with the long zoom mirror assembly being positioned along its track length at the location required to give the magnification ratio selected within the larger range.

It is yet another object of the present invention to provide a microform printer having a magnification range of 7.4× through 32× using a single fixed focal length objective lens without substantially increasing the size of the printer console. To this end, the short zoom mirror assembly is movable horizontally along a track guide system from front to back within the console adjacent the top thereof, while the long zoom mirror assembly is movable vertically along a track guide system from top to bottom within the console adjacent the back thereof. The combination of the horizontal and vertical movements of the respective short and long zoom mirror assemblies provides the required total conjugate length for the optical path to accomodate the wide spread in the desired range of the magnification ratios.

It is still another object of the present invention to combine the aperture and shutter functions in one mechanism as close as possible to the image slit for the optical system. For this purpose, the aperture shutter assembly includes two elongated blades that may be adjusted relative to on another in precise increments accurately spacially to define therebetween the aperture of the optical system, which controls the exposure of light onto the drum. One of these blades may be rapidly moved relative to the other to close the space or aperture therebetween to perform the shutter function. This movable blade subsequently returns to the precise spacial location selected to reestablish the desired aperture spacing for the next microform image to be printed.

It is yet another object to have edge masks included in the aperture shutter assembly to provide the edge masking function as closely adjacent the image slit of the optical system as possible. The edge masks may be in the form of two pieces of rolled film which are simultaneously advanced toward one another or retracted away from one another automatically to control the spacing therebetween to perform the masking function. These film strips are guided in their advancement and retraction by edge guide positioned closely adjacent the two blades cooperatively forming the aperture and shutter control.

These and other objects and advantages of the present invention will become apparent as the following description proceeds.

DESCRIPTION OF THE DRAWINGS

In the drawings:

FIG. 3 is a side elevation of the aperture shutter assembly of the present invention which is positioned in the microform printer immediately adjacent the image slit of the optical system;

FIG. 4 is a plan view of the aperture shutter assembly taken substantially along the plane 4—4 in FIG. 3; and FIG. 5 is a partial front elevation of part of the edge mask assembly taken substantially along the plane 5—5 in FIG. 4.

DETAILED DESCRIPTION OF THE PREFERRED EMBODIMENT

Figure 1:
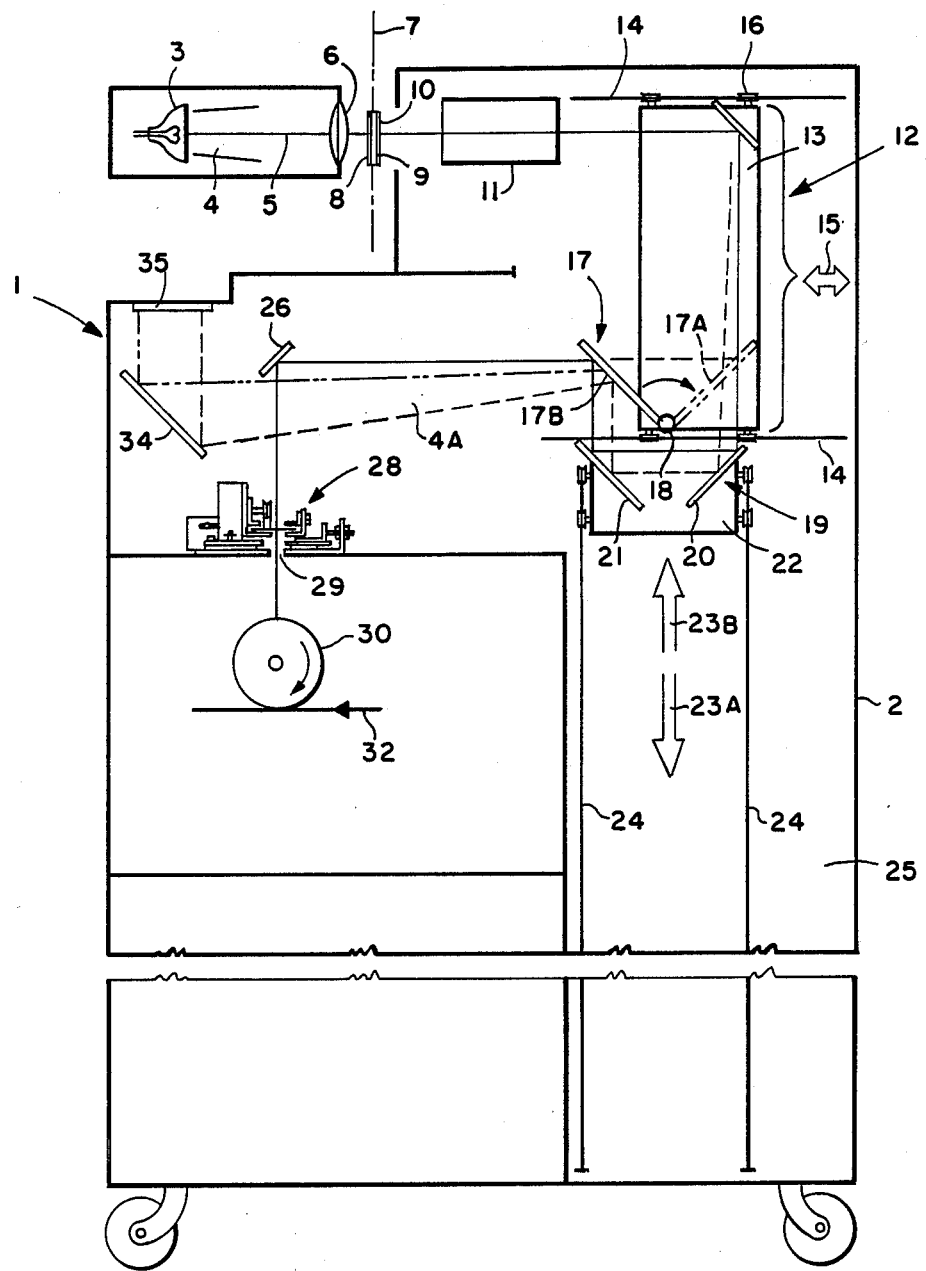
FIG. 1 is a side elevation of one embodiment of the microform printer of the present invention showing potential optical paths utilizing the short and/or long zoom mirror assemblies, with the center ray along the optical axis being used to print and the outer portions of the optical light cone being used for a pilot screen.

Turning now in more detail to the drawings and initially to FIG. 1, the microform printer unit, indicated generally at 1, includes an outer housing or console 2. The microform printer includes a projection lamp 3 emitting a light beam 4. The optical axis or center of the light beam is identified by reference numeral 5. The light beam passes through a condenser lens 6 and the film plane 7. The film plane 7 is perpendicular to the optical axis 5 and is cooperatively defined by two closely spaced glass flats 8 and 9. The microform 10, which can be in the form of microfilm frames, rolled microfilm or aperture cards, is passed through and held flat by glass flats 8 and 9 in film plane 7.

The light beam emitted from the microform in axial alignment therewith optically carrys the latent microform image through an objective lens 11 having a fixed focal length. In the preferred form of the present invention, the objective lens 11 has a focal length of 90 millimeters. The light beam leaves the objective lens 11 and is directed to the short zoom mirror assembly, indicated generally at 12.

The short zoom mirror assembly 12 includes an optically complementary pair of mirrors commonly mounted on a first carriage frame 13. The carriage frame 13 may be reciprocally horizontally driven by a stepper motor (not shown) along track or guide 14 from front to back of the console 2 adjacent the top thereof as indicated by arrows 15. The carriage frame 13 is positioned along the track 14 at a location to give the optical path length required for the magnification ratio selected by the light beam being reflected off the complementary pair of zoom mirrors. To this end, the first pair of short zoom mirrors includes a first or upstream mirror 16 fixed to the first carriage frame 13 at an angle of 135° to the horizontal. The light beam is reflected off mirror 16 and is directed toward the second or downstream pivotal mirror of the short zoom pair, indicated generally at 17.

The second pivotal mirror 17 on the short zoom mirror assembly is mounted on an axle 18 carried by frame 13. This axle is rotatably driven through an arc of 90° to pivotally drive second mirror 17 between a first position 17A, shown in phantom lines, and a second position 17B, shown in full lines. When the second pivotal mirror 17 of the short zoom mirror assembly is in position 17A, the long zoom mirror assembly, indicated generally at 19, is switched out of the optical path of the system. However, when the second mirror 17 is in the full line position 17B, the long zoom mirror assembly is switched into the optical path of the system.

The long zoom mirror lens assembly indicated generally at assembly 19, includes a pair of optically complementary mirrors comprising a first or upstream mirror 20 and a second or downstream mirror 21. First and second mirrors 20 and 21 are fixedly respectively mounted at 45° and 135° angles relative to the horizontal on an adjustable second carriage frame 22. The second carriage frame 22 for the long zoom mirror assembly is vertically reciprocally driven by a motor (not shown) in the directions indicated by the arrows 23A and 23B along tracks or guides 24. The long zoom mirror assembly 19 is thus vertically driven up and down in a compartment 25 at the back of printer console 2. This additional length provided for the optical path by using the vertical space in compartment 25 permits the printer to provide a magnification ratio range from 12.5× through 32×. The second carriage frame 22 when positioned at the upper end of tracks 24 provides clearance for movement of first carriage frame 13 along tracks 14.

For the lower magnification ratio range, for example from 7.4× to 12.5×, the second downstream mirror 17 on the short zoom mirror assembly is pivotally moved to the phantom line position 17A. The short zoom lens assembly 12 is then adjusted along tracks 14 relative to objective lens 11 to a location providing the optical path length required for the magnification ratio selected. The magnification ratio is the lowest, for example 7.4×, when the short zoom mirror assembly 12 is at the left end of its tracks most closely adjacent the objective lens and progressively increases until reaching the upper end of the lower range, for example 12.5×, when the short zoom mirror assembly is at the right end of its tracks.

When the short zoom lens is positioned in accordance with the selection made, lamp 3 is energized, and the light beam 4 passes through condenser lens 6, the microform image 10, and the objective lens 11. The light beam emerging from objective lens 11 is reflected off mirror 16 and mirror 17, in its position 17A, to reflective mirror 26. The center ray of the light beam reflected from mirror 26 passes through the aperture and shutter assembly, indicated generally at 28, and image slit 29 of the system onto the surface of photoconductive printer drum 30.

The microform image thus exposed as a latent image on the photoconductive drum by the light travelling along the optical axis 5 of the light beam is substantially the size of the paper being printed. This latent image is photoconductively transferred from drum 30 to paper traveling along a paper feed path 32 toward a print delivery bin. The rotating photoconductive drum reproduction technique is conventional except that the charges on the drum and toner are opposite to the conventional reproduction system because microform has a dark background and clear characters instead of the reverse.

For a higher magnification ratio range, for example from 12.5× to 32×, the mirror 17 is pivoted through a 90° arc to its position 17B. The first short zoom lens assembly 12 is adjusted to a position vertically aligning first mirror 16 on the short zoom assembly 12 with first mirror 20 on the long zoom assembly 19. Finally, the long zoom assembly 19 is vertically adjusted by moving second carriage 22 along tracks 24 to a position providing the required optical path length to obtain the selected magnification ratio. The downward vertical travel of the second carriage frame 22 in the back compartment of the console 2 provides progressively increasing optical path lengths for the upper magnification ratios required, with a magnification ratio of 32× being achieved when the long zoom mirror assembly 19 is at the lowest end of tracks 24.

With the long zoom mirror assembly adjustments made, the center ray of light beam 3 travelling along the optical axis 5 sequentially follows an optical path passing through condenser 6, microform image 10, and objective lens 11 and reflecting off mirror 16, mirror 20, mirror 21, mirror 17, in position 17B, and mirror 26 to drum 30. The optical system of the present invention in either the short zoom or long zoom mode can be prefocused by using a pilot screen.

For this purpose, a pilot screen mirror 34 is fixedly mounted to printer console 2 at a 135° angle relative to the horizontal. The outer portions 4A of the optical cone of the light beam leaving mirror 17 are reflected off pilot mirror 34 to pilot screen 35. The optical path length to pilot screen 35 off mirror 34 substantially equals the optical path length to drum 30 off mirror 26. The operator may view the magnified image of the microform at pilot screen 35 and may adjust system lenses as required to bring the optical system into focus for the microform image being printed. Thereafter, the printing sequence is begun with the preselected magnification ratio being used.

When a short zoom mirror assembly and long zoom mirror assembly are used in combination in a system where the image slit 29 is long, pivotal second mirror 17 may become very large, both in its length for the image slit and in its width for the pilot screen. For example, with an E size printer, the length of the image slit 29 is 36 inches. The mirror 13 would then have to be approximately 30 inches in length alone to provide the necessary latent image transmission through slit 29 to drum 30. A mirror of this size is relatively heavy and would require a large motor to accomplish the 90° pivotal arcuate movement of the mirror 17 between its two respective positions. An alternative embodiment for eliminating such large motor in switching the long zoom mirror assembly into and out of the optical path is illustrated in FIG. 2.

Figure 2:
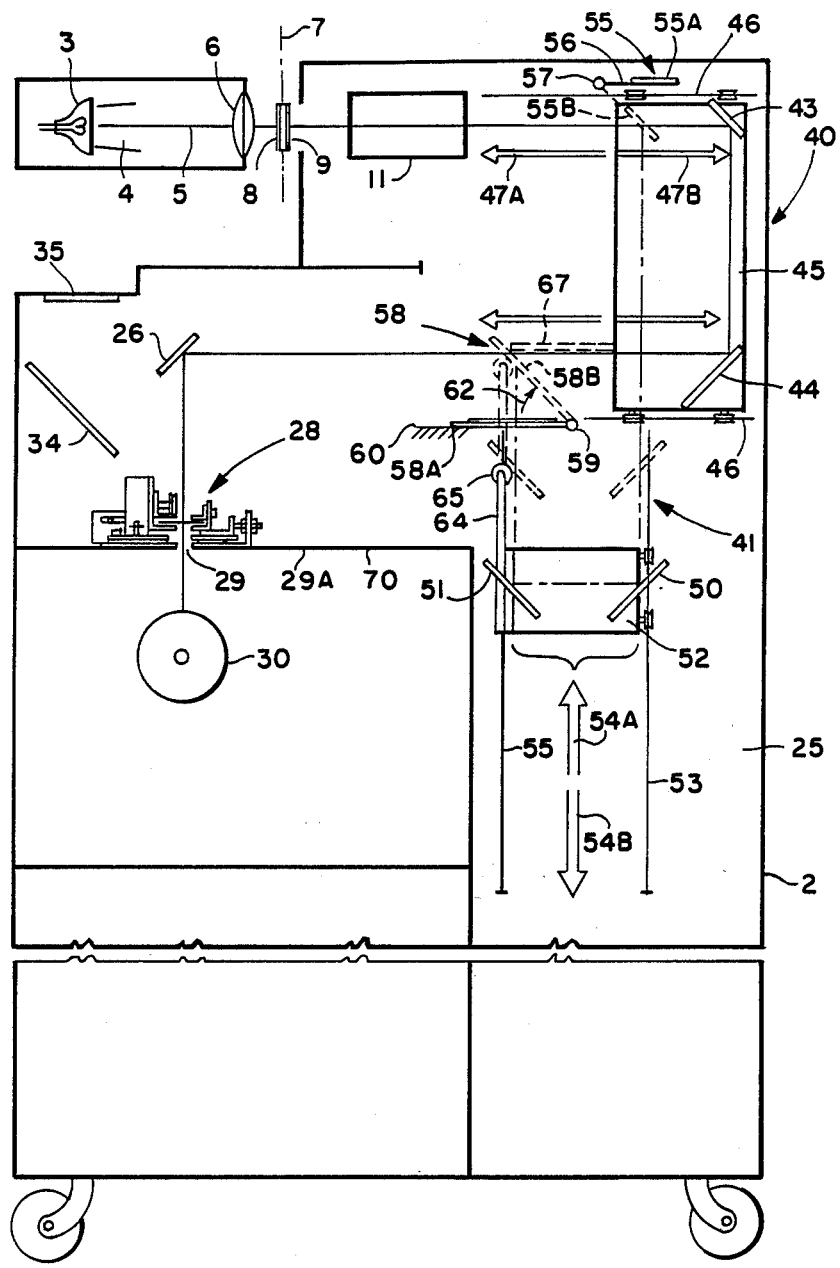
FIG. 2 is a side elevation of a second embodiment of the printer of the present invention showing a different structural and functional arrangement for the short and long zoom mirror assemblies and the optical switching therebetween.

In FIG. 2, the structural features in the second embodiment, which are the same as the structural features in the first embodiment, are identified by the same reference numerals. The principal differences in the second embodiment relate to the structure and function of the short zoom mirror assembly, indicated generally at 40, and the long zoom mirror assembly, indicated generally at 41.

The short zoom mirror assembly includes a first pair of optically complementary mirrors comprising a first upstream mirror 43 and a second downstream mirror 44. The first and second mirrors 43 and 44 are respectively fixedly mounted at 135° and 45° relative to the horizontal on first carriage frame 45. The first carriage frame 45 is reciprocally driven by a motor (not shown) along horizontal parallel guides or tracks 46 from front to back in console 2, as indicated by the arrows 47A and 47B. First carriage frame 45 is thus horizontally advanced or retracted along tracks 46 in console 2 adjacent the top thereof.

The long zoom mirror assembly 41 includes an optically complementary pair of mirrors comprising first mirror 50 and second mirror 51. The mirrors 50 and 51 are respectively fixedly mounted at 45° and 135° relative to the horizontal on a reciprocally driven second carriage frame 52. The second carriage frame 52 is driven by a motor (not shown) along vertically extending, parallel guides or tracks 53. The long zoom mirror assembly 41 is thus vertically lowered or elevated in compartment 25 at the back of console 2 as indicated by arrows 54A and 54B.

The optical path of printer 1 for the second embodiment is switched between the short zoom mirror assembly 40 and the long zoom mirror assembly 41 by a pair of pivotally mounted switching mirrors. The first pivotal switching mirror, indicated generally at 55, is positioned adjacent the top wall of the printer console 2 between objective lens 11 and the back wall of such console. Pivotal switching mirror 55 is mounted on swing arm 56 secured to rotatable axle 57. Pivotal switching mirror 55 has a first position 55A, shown in full lines in FIG. 2, in which mirror 55 is substantially parallel to the top wall of the console allowing first carriage frame 45 to be driven therepast. Switching mirror 55 can be arcuately swung through an angle of 45° around axle 57 to a second position 55B shown in phantom lines in FIG. 2. A motor (not shown) or other actuator is provided to reciprocally arcuately drive the switching mirror 55 between its two positions. The motor or actuator can be a relatively small, low force device because of the relatively small size of mirror 55.

The second pivotal mirror, indicated generally at 58, is mounted on a rotatable axle 59. The second pivotal switching mirror 58 is horizontal in its first position 58A and rests upon a stop 60 fixedly secured to console 2. In such first horizontal position, mirror 58 provides clearance to first carriage frame 45 of the short zoom mirror assembly, allowing frame 45 to be reciprocally driven therepast. The second pivotal mirror 58 can be upwardly arcuately driven through an angle of 45°, as indicated by arrow 62, into a second position, shown in phantom lines at 58B.

The second pivotal switching mirror 58 is driven between its two respective positions 58A and 58B by an actuator arm 64 connected to an extending upwardly from second carriage frame 52 on the long zoom mirror assembly. The distal end of the actuator arm 64 has a roller 65 mounted thereon to engage the second pivotal switching mirror 58. As the second carriage frame 52 of the long zoom mirror assembly 41 is elevated in the direction of arrow, roller 65 engages the lower side of second pivotal switching mirror 58 and arcuately drives the same as indicated by arrow 62. The relatively large drive motor required to lower and elevate the second carriage frame 52 has more than enough power to drive second switching mirror 58 through its pivotal movement.

The second pivotal mirror 58 can be latched in its second position 58B in several different ways. For example, when mirror 58 has been driven through an arc of 45°, motor driven latches (not shown) can be actuated from the sides to engage and hold the second pivotal mirror 58 in the desired position 58B. When the second pivotal mirror 58B has to be lowered to its first position 58A, the motor driven latches are retracted and the long zoom mirror assembly carriage frame lowered until the second pivotal mirror 58 engages stop 60.

Alternatively, the second carriage frame 52 for the long zoom mirror assembly can be sufficiently elevated so that the actuator arm assembly 64 drives the mirror 58 initially through an arc greater than 45°. When the mirror 58 is in such position, the first carriage frame 45 of the short zoom mirror assembly is advanced slightly to the left as viewed in FIG. 2 in the direction of arrow 47A. The first carriage frame 45 has a latch arm 67 mounted thereon and extending forwardly therefrom. As frame 45 is advanced, the end of this latch arm 67 is received in a hole in an outwardly extending bracket (not shown) mounted on second pivotal mirror 58. The second carriage frame 52 of long zoom mirror assembly 41 is then lowered until the bracket surface defining the hole rests or perches upon latch arm 67 to secure mirror 58 in position 58B.

To lower second pivotal mirror from its position 58B with this latching embodiment, the second carriage frame 52 of long zoom mirror assembly 41 is elevated slightly to break the engagement between the bracket and latch arm 67. The first carriage frame 45 is then withdrawn to the right as viewed in FIG. 2 to remove latch arm 67 from the bracket. The second carriage frame 52 is then lowered until actuator arm 64 positions second pivotal switching mirror 58 on stop 60.

In the operation of the second embodiment, for the lower range of magnification ratios, first pivotal switching mirror 55 and second pivotal switching mirror 58 are in their respective horizontal positions 55A and 58A. The second carriage frame is sufficiently lowered to a park position providing clearance for selective reciprocal movement of the first carriage frame 45. The frame 45 of short zoom mirror assembly 40 thus has clearance to be moved along its tracks to the position required to provide the necessary optical path length for the magnification ratio selected. The center ray of the light beam emanating from objective lens 11 is sequentially reflected off mirrors 43, 44 and 26 to pass through aperture shutter assembly 28 to printer drum 30.

To switch to a magnification ratio in the upper range, the first carriage frame 45 of the short zoom mirror assembly 40 is driven to the end of its tracks at the back of console 2 to assume a short zoom parking position which provides clearance for the two pivotal switching mirrors to be swung into their respective second or closed positions 55B and 58B. For this purpose, first mirror 55 is driven arcuately downwardly to position 55B intersecting the optical axis 5 of the optical system. The second mirror 58 is driven arcuately upwardly and latched in its second position 58B where it intersects the optical axis 5 of the optical path through the long zoom mirror assembly 41.

With mirrors 55 and 58 in their respective second positions 55B and 58B respectively, the light beam emanating from objective lens 11 is sequentially reflected off of mirrors 55B, 50, 51, 58B and 26 to pass through aperture shutter assembly 28 to printer drum 30. The second carriage frame 52 of the long zoom mirror assembly is vertically positioned along guides 53 in the location necessary to provide the optical path length required for the zoom magnification ratio selected at the upper end of the magnification ratio range.

Two different switching embodiments to provide large magnification ratio range in the printer 1 by utilizing short and long zoom mirror assemblies in conjunction with a single objective lens 11 of fixed focal length have been illustrated in FIGS. 1 and 2. The quality and marginal definition of the print made in this large print machine is enhanced by the aperture shutter assembly 28, as best shown in FIGS. 3 through 5.

The aperture shutter assembly 28 of the present invention provides aperture control, shutter control and mask control immediately adjacent the image slit 29. These three functions can all be remotely and automatically controlled from the printer system keyboard and/or from an optical sensing and control circuit.

In the aperture shutter assembly 28, the image slit 29 is provided in a base member 70 for the aperture shutter assembly lying along and above the image slit plane 29A. The base member 70 has an upstanding elongated back wall 71 having a pair of spaced adjustment screws 72 passing therethrough. One end of each adjustment screw 72 respectively engages upstanding flanges 74 on spaced adjustment brackets 75 aligned therewith. A first elongated blade 76 is fixedly secured to the bottom surfaces of adjustment brackets 75. This first blade 76 extends for the full length of the slit 29 and may be adjusted toward and away from such image slit 29 initially to set its leading edge 76A as one side of the system aperture.

For this purpose, two clamping fasteners 78 are provided for each adjustment bracket 75. The shanks of fasteners 78 pass through elongated holes in both adjustment bracket 75 and first blade 76 into respective threaded engagement with connection blocks 79. When fasteners 78 are rotated to elevate the head of the fastener above each spaced adjustment bracket 75, the first blade 76 may be moved inwardly and outwardly to the position desired relative to slit 29. The fasteners are then advanced to have the heads thereof clampingly engage the adjustment brackets 75, and the spaced screws 72 are adjusted to engage flange 74 fixedly to secure first blade 76 in the selected position.

The blade 76 is dimensionally stabilized and controlled in this adjustment movement in and out by a plurality of spaced upstanding pins 81 on the frame respectively riding in elongated slots 82 in blade 76. The slots are just slightly wider than the pins to provide some very limited adjustment of the blade and its edge if necessary. Such spaced pin and slot connections provide freedom for adjustment in and out while substantially eliminating any cocking propensity of the first blade relative to image slit 29 during such movement.

When first blade 76 has been fixed in position, a second movable blade 84 is initially positioned relative to the first blade 76 to define therebetween the aperture for the system. Specifically, the space between the leading edge 84A of second blade 84 and the leading edge 76A of first blade 76 cooperatively define an elongated slot 85 therebetween constituting the aperture of the optical system. The nominal aperture slit widths, depending on magnification ratio, vary from 0.030 to 0.125 inches. In order to improve uniformity in exposure, the aperture slit 85 is preferably dimensionally precise to the order of 0.001 inches across the entire respective lengths of first blade 76 and second movable blade 84. The edges 76A and 84A of the respective blade are controlled in straightness to 0.001 inches or less through a final shearing operation. The edge 84A of second blade 84 can be brought to a position just closing the aperture and, if necessary, the edge 76A of first blade 76 can be adjusted slightly to uniformly close the aperture across its entire length before clamping blade 76 in position. The precision of aperture opening width is also further provided by the mounting, adjustment and drive of such second blade 84 relative to first blade 76.

Second blade 84 has two upstanding pins 86 mounted thereon in spaced relationship along its length as shown in FIG. 4. These pins 86 are respectively received in and ride along diagonally inclinded slots 87 in two spaced control brackets 88 fixedly mounted to base 70 of assembly 28. Each of the slots 87 defines an inclined camming surface or ramp 90 along which upstanding pin 86 rides during reciprocal movement of second movable blade 84 in the diagonal directions illustrated by arrows 91.

The movable blade 84 thus has its edge 84A advance toward and retract from the edge 76A of first fixed blade 75 in the directions indicated by arrow 91, such movement being accurately controlled by the spaced pin and camming surface innerconnections. The exact position of second movable blade 84 relative to first fixed blade 76 for establishing the aperture width can be accurately selected by use of a linear actuator 93.

This linear actuator includes an actuating shaft 94 which may be accurately advanced and retracted in defined incremental steps of 0.001 inches by stepped linear actuator 93. The end of the actuation shaft abuts, but is not connected to, actuating arm 95 extending outwardly from and being rigidly secured to second movable blade 84. The actuating arm 95 is normally urged into abutment with the end of actuating shaft 94 of linear actuator 93.

To this end, each upstanding pin 86 on movable second blade 84 has one end of a spring 97 secured therearound. The other end of the spring 97 is fixedly secured to part of the console housing 2 as indicated schematically at 98. The springs 97 provide a normal bias in a diagonal direction as indicated by arrow 99 normally to urge the pins 86 to the lower right hand ends of their respective slots 87, as illustrated in FIG. 4. Thus springs 97 are urging second movable blade 84 downwardly and to the right as viewed in FIG. 4 to bring actuating arm 95 into abutment with the end of actuator shaft 94.

When linear actuator 93 is actuated incrementally to advance actuation shaft 94, the end thereof will advance in measurable incremental distances until it reaches a predetermined location where it acts as a stop precluding further retraction of second blade 84. When actuating arm 95 engages the end of shaft 94, the retraction position of second blade 84 is fixed and the aperture width thus defined. To widen the selected aperture width, the linear actuator 93 is actuated to retract actuator shaft 94. The second blade will diagonally retract under spring bias until actuating arm 95 reengages the end of shaft 94 to preclude further movement and thus reset the selected wider aperture width.

The second movable blade 84 can also be used in the present invention to perform a shutter function totally to close the aperture slit 85 between first and second blades 76 and 84, respectively. The second movable blade 84 is slidingly mounted just above the base member 70 to move in a plane discrete from but just below the plane of first blade 76, as best shown in the FIG. 3. Thus, when movable blade 84 is advanced to close the aperture slit, the upper surface of the second movable blade 84 will slide just under and partially underlap the lower surface of the first fixed blade 76 to block substantially all light from passing therethrough.

A solenoid motor 101 is fixedly mounted on the console 2 and controls the shutter movement function of second movable blade 84. The solenoid 101 has a drive arm 102 reciprocally advanced or retracted upon motor actuation, as indicated by the arrows 103. A control link 105 is pivotally connected at one end to drive arm 102 and is pivotally connected at its other end to actuating arm 95 on second movable blade 84. The solenoid motor is fast acting rapidly to move second blade 84 relative to first blade 76 to close the aperture slit 85.

Beginning in the position illustrated in FIG. 4, the solenoid 101 may be actuated to retract drive shaft 102 which moves and pivots link 105 to the position shown in phantom lines in FIG. 4. This movement of the link 105 rapidly diagonally drives the second movable blade 84 upwardly and to the left as viewed in FIG. 4 to bring the leading edge 84A thereof under the leading edge 75A of first blade 76 to close the aperture therebetween, thereby to complete the shutter closing function.

To reopen the shutter, solenoid 101 is actuated to advance drive shaft 102, which in turn moves and pivots link 105 back to its full line position shown in FIG. 4. This link movement diagonally drives the second movable blade 84 downwardly and to the right as viewed in FIG. 4 until actuating arm 95 again abuts the end of actuating shaft 94 on linear actuator 93 to reestablish the preselected aperture spacing between edges 76A and 84A on the respective blades.

The solenoid 101 is always actuated to close the aperture before operating linear actuator 93 to adjust the position of actuating shaft 94 for setting a different aperture width. With second blade 84 in its closed position, the actuating arm 95 is not in engagement with the end of actuating shaft 94. Since shaft 94 is not working against a load during aperture width adjustment, a relatively small linear actuator may be used. In essence, the end of the actuator shaft 94 on linear actuator 93 thus only acts as a control stop accurately to reposition the blades relative to one another for controlling aperture slit width for the magnification ratio selected. Blades 76 and 84 thus provide both the aperture and shutter function under accurate controls immediately adjacent the image slit plane 29A.

This joint aperture and shutter control is combined with edge masking in the aperture shutter assembly 28. This edge masking function is provided by two plastic strips pulled in a track by a drive system. As best shown in FIGS. 3-5, the edge masks act in synchronism toward and away from one another from the left and right hand sides of the assembly 28 as viewed in FIG. 4. The edge masks are identical other than the direction of operation, and thus a single edge mask will be described below, with the opposite edge mask being identified by the same reference numerals followed the suffix "A".

Turning to the right hand edge mask, a thin and narrow, flexible strip material 107 is wound in a cylinder 108. The lead 109 of the strip material 107 is flat and is guided in its extension and retraction. For this purpose, strip 107 is wider than the maximum width of the aperture slit 85 (as controlled by the ends of diagonal camming slots 87) and has its marginal edges slidingly restrained by edge guides 110 and 111, as best seen in FIG. 3.

For extension and retraction relative to aperture 85, the ends of the plastic strips forming the edge masks may be driven by an endless cable system, indicated generally at 114. This endless cable system is controlled by a capstan 115 driven by stepper motor 116. The path of the cable 118 is criss-cross with the ends thereof being attached to the lead ends 109 and 109A of the strips synchronously to drive the two edge mask strips 107 and 107A in opposite directions. When the strips 107 and 107A are driven toward one another, the necessary strip material is withdrawn from cylinders 108 and 108A for equal movements of the same toward one another under the drive of the endless cable system 114. The spacing between the respective ends of the strips 107 and 107A defines the ends of the aperture slit 85 and thus controls the edge masking function for the print. When the strip ends 109 and 109A of the strips 107 and 107A are synchronously driven away from one another, the excess strip material is rewound into the cylinders 108 and 108A.

Although the operation of the printing system, in general, and of the aperture shutter assembly, in particular, are believed apparent from the above, a brief description of the operation is provided for purposes of completeness. Prior to the microform being positioned between plates 8 and 9 for printing, the operator selects the amount of magnification desired and further selects the paper size to be used for that magnification. This selection results in the short zoom mirror assembly and/or long zoom mirror assembly being positioned in proper location along their respective track lengths to provide the optical path length needed for that magnification ratio. The optical system is also preconditioned by switching pivotal mirrors to include or exclude the long zoom mirror assembly as required for the optical path length selected.

In addition, the aperture shutter assembly 28 is adjusted for the microform being printed. To this end, the second movable blade 84 is accurately positioned relative to the first blade 76 to provide an aperture slit width 85 therebetween of optimum dimension for the background density on the microform being printed and to compensate for the change of light caused by the optical path length. By enlarging the aperture size, the light exposure on the photoconductive drum 30 is increased and vice versa. The relative position of the fixed and movable blades 76 and 84, respectively, is controlled to set an aperture slit width providing drum light exposure optimally correlated to the background density observed for the microform images being printed.

The edge masks are adjusted by advancing or retracting the ends 109 and 109A of strips 107 and 107A, respectively, to control the spacing therebetween in accordance with the top and bottom edge locations of the microform being printed. Thus, for example, the respective ends 109 and 109A may be driven toward one another by stepper motor 116 to position the same relative to aperture slit 85 in accordance with the spacing between the top and bottom edges of the latent microform image optically passing therethrough effectively to mask the edges of the resultant print in accordance with the edges of the microform image. Edge masking with strips 107 and 107A eliminates light exposure to the drum for areas beyond the desired active width for the print.

Finally, the shutter function is rapidly obtained by second blade 84 being actuated by soleniod 101 to close the aperture slit 85 between the microform images being printed. As such, the light beam of the optical system is blocked and no light is directed into exposure with printer drum 30 when a microform image is not in alignment with the optical axis 5 of the optical path. The second blade 84 providing the shutter function opens at the leading side edge of the microform image being printed and closes at the trailing side edge of the microform edge being printed to provide a lateral edge masking function.

It will be apparent from the foregoing that changes may be made in the details of construction and configuration without departing from the spirit of the invention as defined in the following claims. For example, if the desired magnification ratio range is varied, a different focal length objective lens might be used, a different optical switching mechanism might be employed, and different track lengths utilized for the short and long zoom mirror assemblies.

I claim:

1. A microform printing system comprising:
   a microform image;
   optics means to pass light from a light source along an optical path including the microform image, an objective lens, image magnification means and image slit to a printing roll for printing the microform image onto plain bond paper;
   the image magnification means including a reciprocally adjustable short zoom mirror assembly selectively to provide magnification within a lower magnification ratio range and a reciprocally adjustable long zoom mirror assembly selectively to provide magnification within a higher magnification ratio range; and
   optical switching means selectively to vary the optical path to exclude or include the long zoom mirror assembly in accordance with the magnification ratio selected.

2. The microform printing system of claim 1 wherein the short zoom mirror assembly includes a first pair of complementary zoom mirrors mounted in spaced relationship on a reciprocally driven first carriage frame and the long zoom mirror assembly includes a second pair of complementary zoom mirrors mounted in spaced relationship on a reciprocally driven second carriage frame.

3. The microform printing system of claim 2 wherein a console encloses most of the printing system, the first carriage frame selectively reciprocally moving front to back in said console adjacent a top thereof and the second carriage frame selectively reciprocally moving top to bottom in said console adjacent a back thereof.

4. The microform printing system of claim 3 wherein the objective lens has a fixed focal length for all magnification ratios.

5. The microform printing system of claim 2 wherein the optical switching means includes means to pivot the downstream mirror of the first pair of zoom mirrors between a first position excluding and a second position including the long zoom mirror assembly.

6. The microform printing system of claim 5 wherein for the higher magnification ratios the first carriage assembly is located to position the upstream mirror of the first pair of zoom mirrors in optical sequential alignment with the upstream mirror of the second pair of zoom mirrors and to position the downstream mirror of the second pair of zoom mirrors in optical sequential alignment with the downstream mirror of the first pair of zoom mirrors in its second position.

7. The microform printing system of claim 6 wherein the second carriage frame includes means selectively to locate the same along its reciprocal path of movement in a position to provide necessary optical path length to provide the upper magnification ratio selected.

8. The microform printing system of claim 5 or 7 wherein for the lower magnification ratios the downstream mirror of the first pair of short zoom mirrors is in its first position, and the first carriage frame includes means selectively to position the same along its reciprocal path of movement in a position to provide the optical path length requied to provide the lower magnification ratio selected.

9. The microform printing system of claim 2 wherein the optical switching means includes first and second pivotal switching mirrors selectively respectively movable between first open positions for an optical path utilizing the short zoom mirror assembly and second closed positions for an optical path utilizing the long zoom mirror assembly.

10. The microform printing system of claim 9 wherein the first pivotal switching mirror is positioned between the objective lens and the short zoom mirror assembly, with the second closed position thereof reflecting the light beam toward the long zoom mirror assembly and blocking the light from reaching the short zoom mirror assembly.

11. The microform printing system of claim 10 wherein the second pivotal switching mirror is positioned between the second zoom mirror assembly and the image slit, with the second closed position thereof reflecting light from the long zoom mirror assembly along the optical path toward the image slit.

12. The microform printing system of claim 11 wherein the second pivotal switching mirror is reciprocally moved between its first and second positions by an actuator arm on and extending from the reciprocally movable second carriage frame.

13. The microform printing system of claim 12 wherein the second pivotal switching mirror is selectively latched in its second closed position by a latch arm on and extending from the first reciprocally movable movable carriage frame.

14. The microform printing system of claim 1 further comprising an aperture shutter assembly positioned immediately adjacent the image slit of the system, the aperture shutter assembly having two blades accurately adjustably set in spaced relationship relative to one another to define the selected slit aperture of the system therebetween and being operative to rapidly close the space therebetween to block the slit aperture and thereafter being operative to return to the set spaced relationship to reopen the slit aperture.

15. The microform printing system of claim 11 further comprising an aperture shutter assembly positioned immediately adjacent the image slit of the system, the aperture shutter assembly having two blades accurately adjustably set in spaced relationship relative to one another to define the selected slit aperture of the system therebetween and being operative to rapidly close the space therebetween to block the slit aperture and thereafter being operative to return to the set spaced relationship to reopen the slit aperture.

16. An aperture shutter assembly for an optical printing system comprising an adjustable first blade selectively secured in a fixed position, a second blade movable relative to the first blade, adjustment means accurately to position the second blade in an open position spaced from the first blade cooperatively to define an aperture therebetween for the optical printing system and drive means rapidly to move the second blade relative to the first blade to a closed position blocking the space therebetween to provide a shutter interrupting the optical printing system.

17. The aperture shutter assembly of claim 16 wherein the adjustment means includes a linear actuator stepper adjustably driving an adjustment shaft engaging, but not being connected to, the movable second blade in its open position, the relative position of the adjustment shaft controlling the space between the first and second blades in the open position of the latter.

18. The aperture shutter assembly of claim 16 wherein diagonal movement of the second blade relative to the first blade is controlled by cam surface means, and the second blade is normally biased along the cam surface means toward the adjustment shaft and its open position.

19. The aperture shutter assembly of claim 17 wherein the drive means includes a solenoid linked to the second blade selectively to drive the latter from its open position to its closed position independently of the adjustment means.

20. The aperture shutter assembly of claim 18 wherein the two blades are movably mounted on a base in closely spaced, discrete planes to allow the second blade to partially underlap or overlap the first blade in the closed position of the second blade.

21. The aperture shutter assembly of claim 19 further comprising edge mask means including aligned film strips having leads synchronously driven toward and away from one another in closely spaced relationship to the first and second blades, with the distance between the leads being correlated to the top and bottom edges of the microform image being printed.

* * * * *